(12) United States Patent
Gonzaga et al.

(10) Patent No.: US 8,464,774 B2
(45) Date of Patent: Jun. 18, 2013

(54) BEAD BREAKER GROUP FOR A TIRE MOUNTING-DEMOUNTING MACHINE

(75) Inventors: Tullio Gonzaga, Correggio (IT); Silvano Santi, Imola (IT)

(73) Assignee: Butler Engineering & Marketing S.p.A., Rio Saliceto (IT)

( * ) Notice: Subject to any disclaimer, the term of this patent is extended or adjusted under 35 U.S.C. 154(b) by 514 days.

(21) Appl. No.: 12/419,743

(22) Filed: Apr. 7, 2009

(65) Prior Publication Data
US 2009/0266493 A1 Oct. 29, 2009

(30) Foreign Application Priority Data
Apr. 28, 2008 (IT) .............................. VR2008A0050

(51) Int. Cl.
*B60C 25/135* (2006.01)
(52) U.S. Cl.
USPC .......................... 157/1.24; 157/1.22; 157/1.26
(58) Field of Classification Search
USPC ...................... 157/1.24, 1.28, 1.17, 1.22, 1.26
See application file for complete search history.

(56) References Cited

U.S. PATENT DOCUMENTS

| | | | | |
|---|---|---|---|---|
| 3,032,095 A | * | 5/1962 | Brosene, Jr. et al. | 157/1.28 |
| 3,858,637 A | * | 1/1975 | Duquesne | 157/1.24 |
| 4,939,941 A | * | 7/1990 | Cellucci et al. | 73/865.8 |
| RE33,892 E | * | 4/1992 | Sims | 157/1.17 |
| 7,188,657 B2 | * | 3/2007 | Boni | 157/1.24 |
| 7,355,687 B2 | * | 4/2008 | Voeller et al. | 356/139.09 |
| 7,497,761 B2 | * | 3/2009 | Gonzaga | 157/1.17 |
| 2003/0094244 A1 | * | 5/2003 | Gonzaga | 157/1.3 |
| 2004/0055712 A1 | * | 3/2004 | Corghi | 157/1.24 |

FOREIGN PATENT DOCUMENTS

| | | |
|---|---|---|
| EP | 1 314 584 A1 | 5/2003 |
| EP | 1 714 807 A1 | 10/2006 |

OTHER PUBLICATIONS

European Search Report, mailed Aug. 13, 2009, in corresponding EP Application No. 09 15 8682, filed Apr. 24, 2009.

* cited by examiner

*Primary Examiner* — Monica Carter
*Assistant Examiner* — Melanie Alexander
(74) *Attorney, Agent, or Firm* — Dickinson Wright PLLC

(57) ABSTRACT

The present invention relates to a bead breaker group for bead breaking a tire of a tired wheel equipped with rim with bead-engagement flanges, the bead breaker group comprising a support (2, 5) and at least one bead breaker tool (3) mounted for rotation around a pin (4) borne by the support (2, 5), the bead breaker tool being substantially flat and comprising:
  at least one portion configured as an abutment front (3b, 3d, 3f) against a flange of a rim of a tired wheel to be bead broken; and
  at least one portion having curved peripheral edge substantially coaxial with the pin (4) and intended to act as an engagement-penetration zone (3a, 3c, 3e) between the flange of a rim and the bead of a tire to be bead broken, the distance between the abutment front (3b, 3d, 3f) and the pin (4) being less than the distance between the pin (4) and the at least one engagement-penetration zone (3a, 3c, 3e).

14 Claims, 7 Drawing Sheets

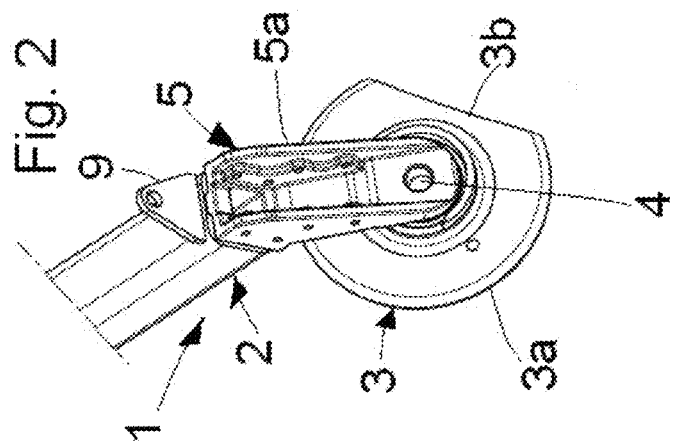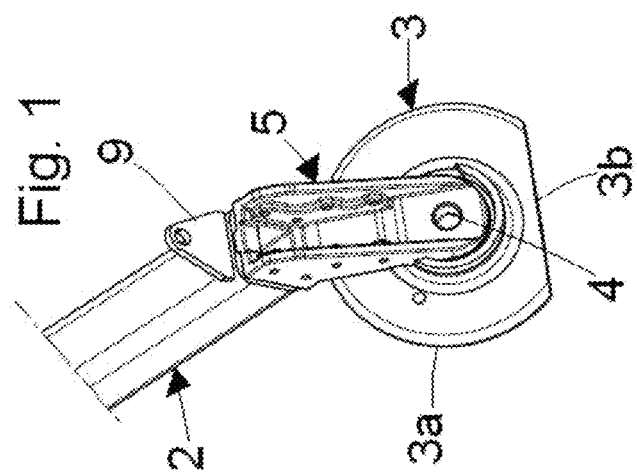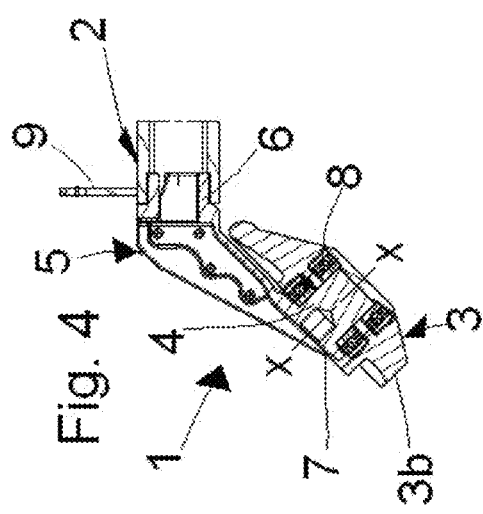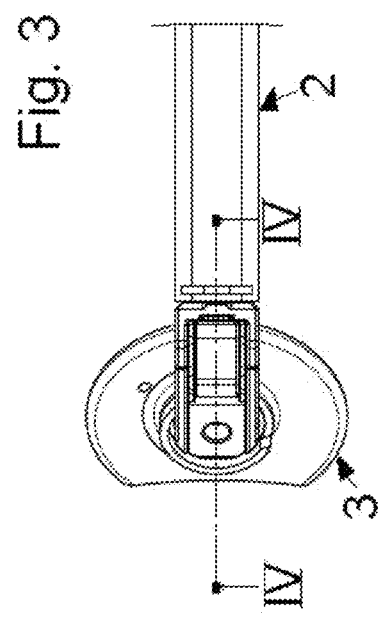

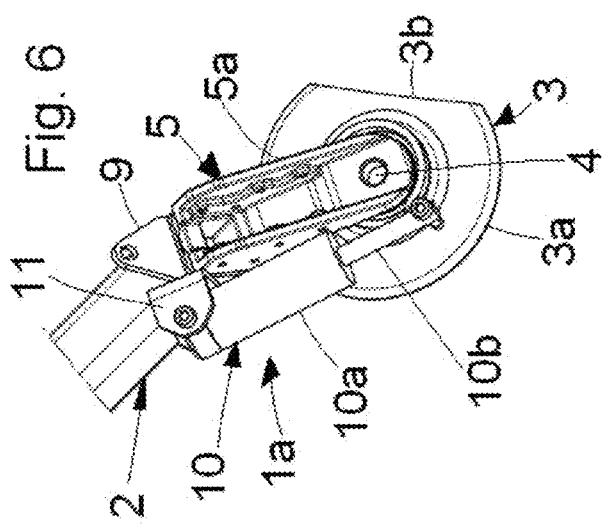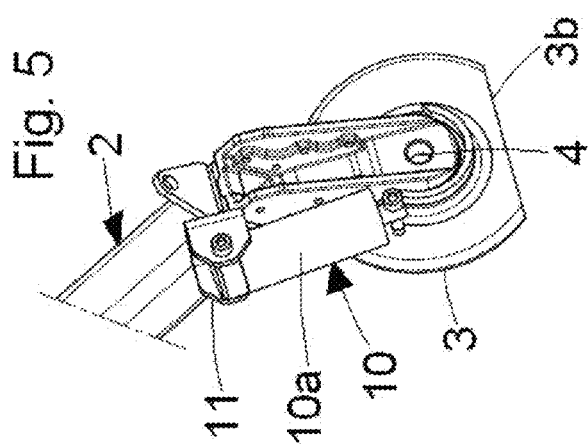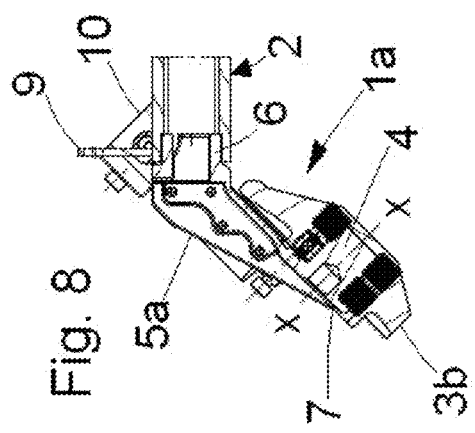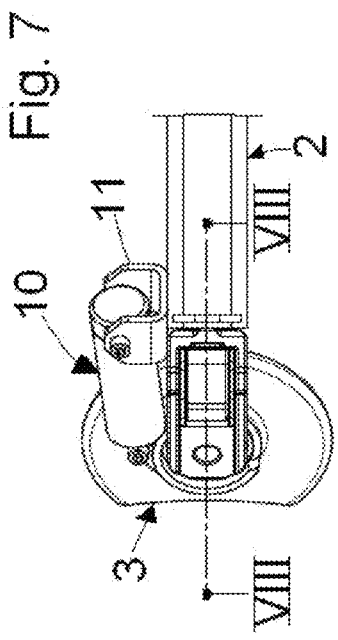

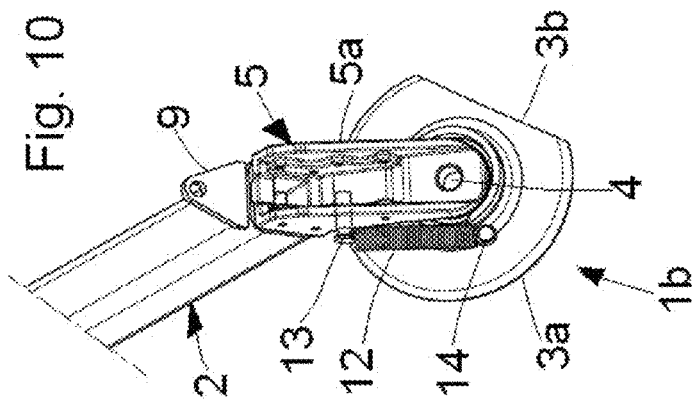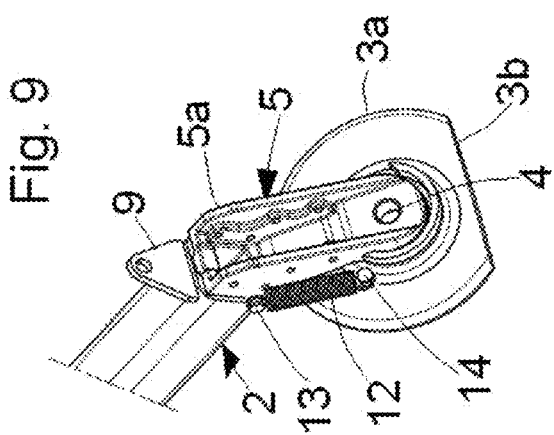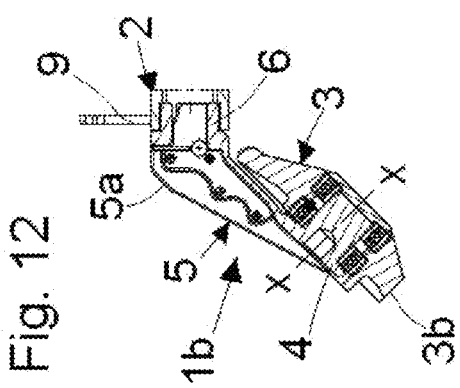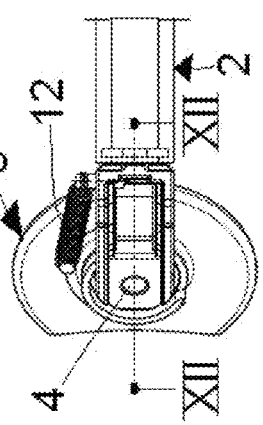

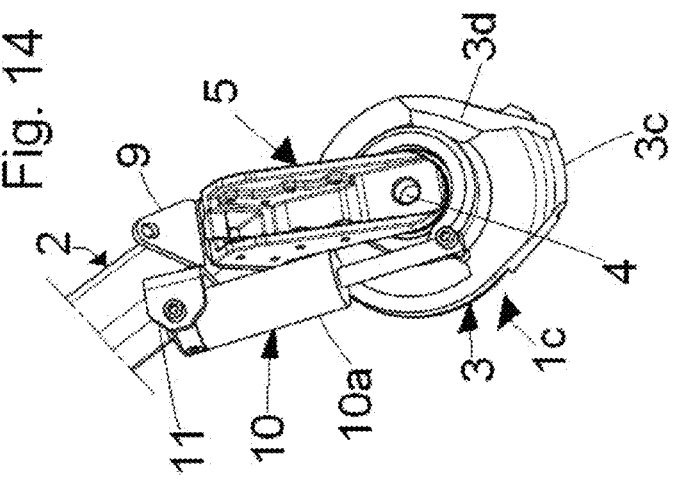
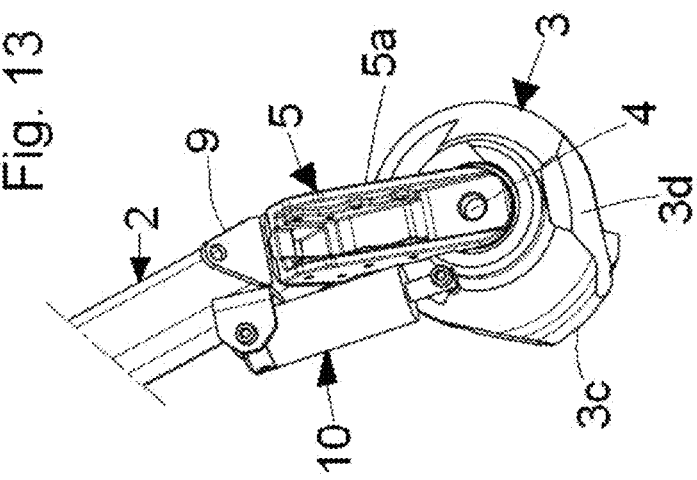
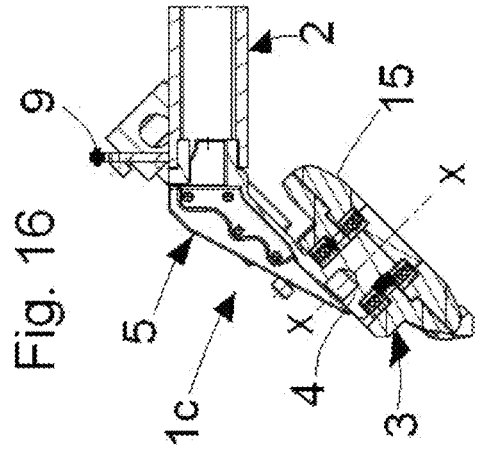
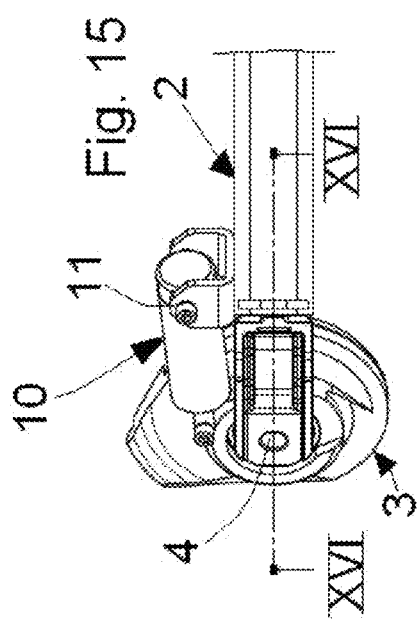

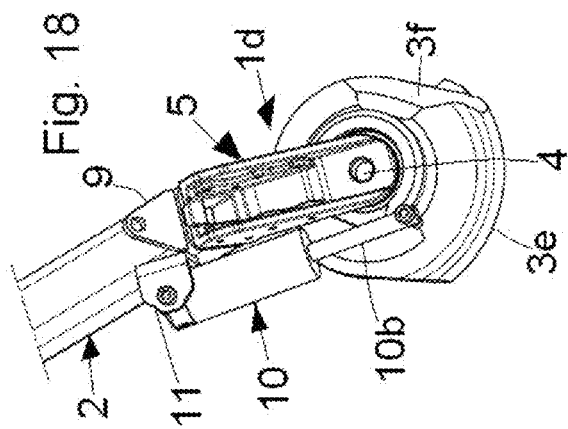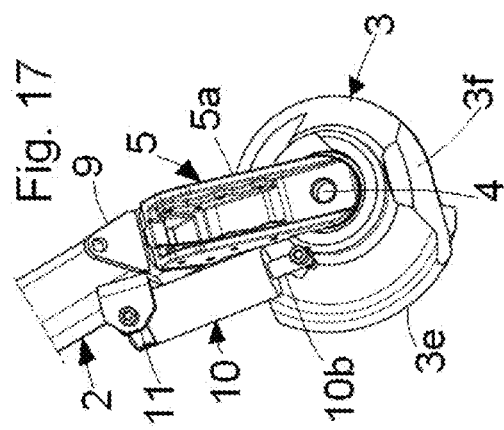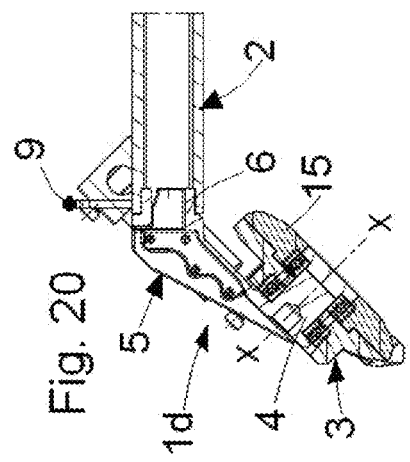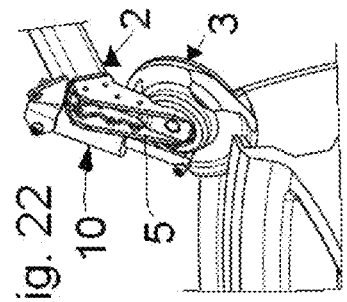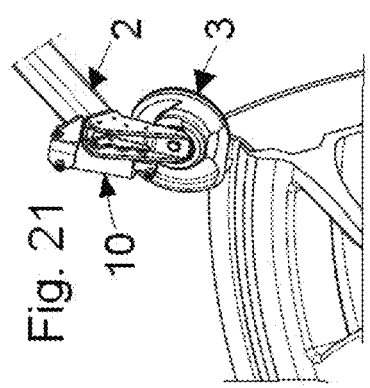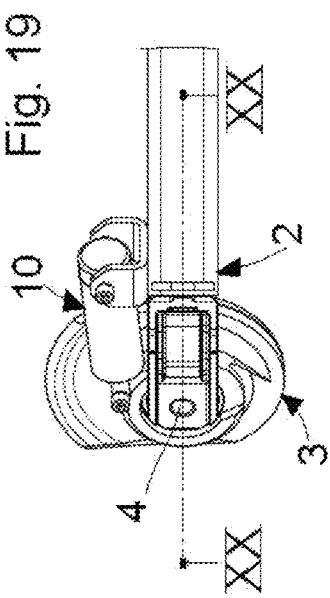

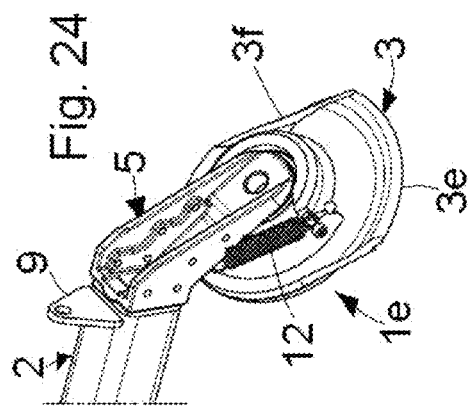
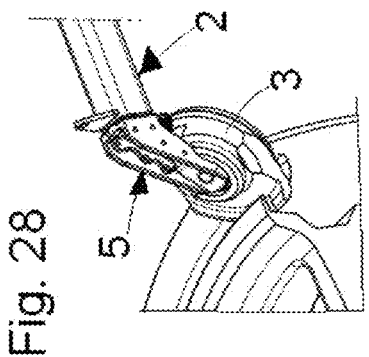
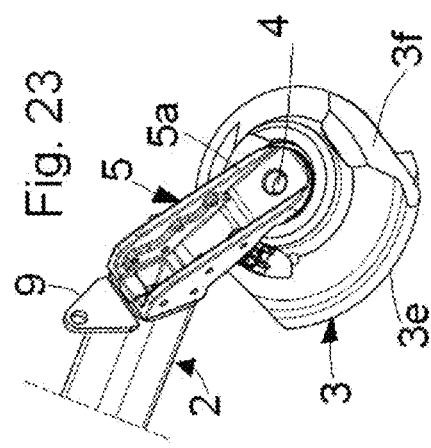
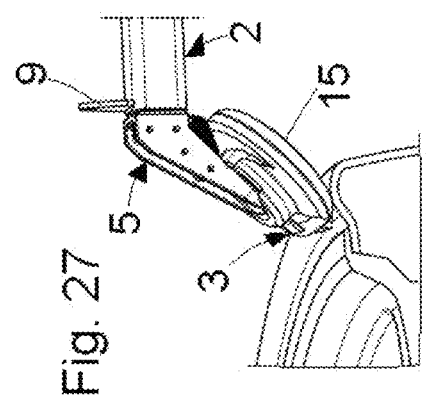
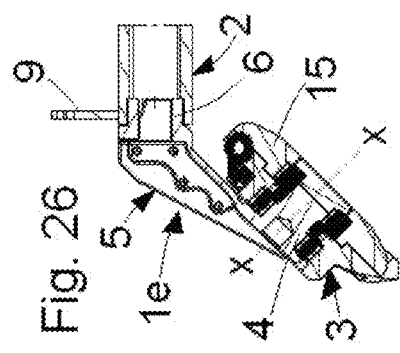
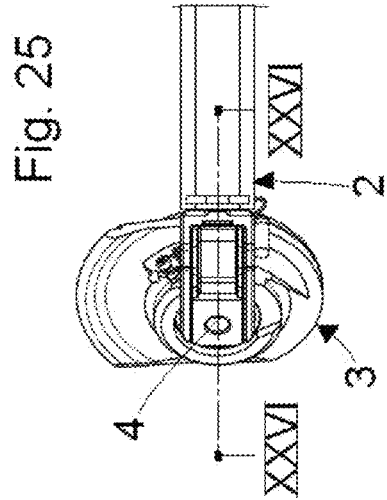

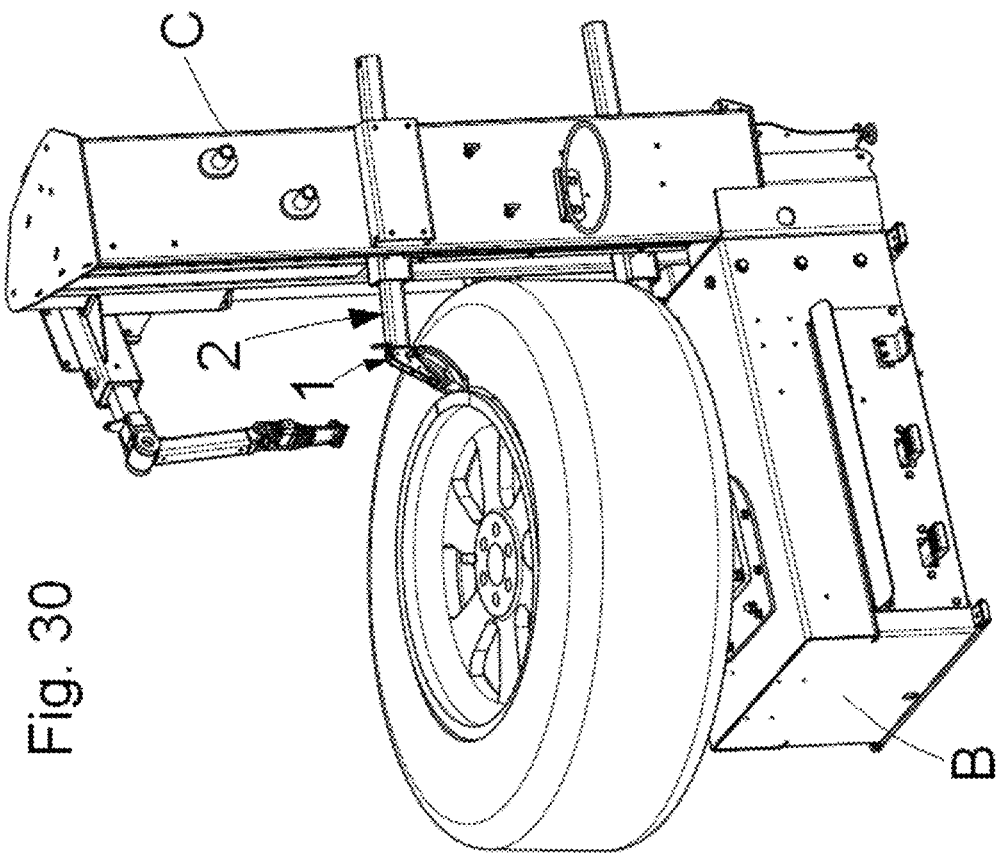
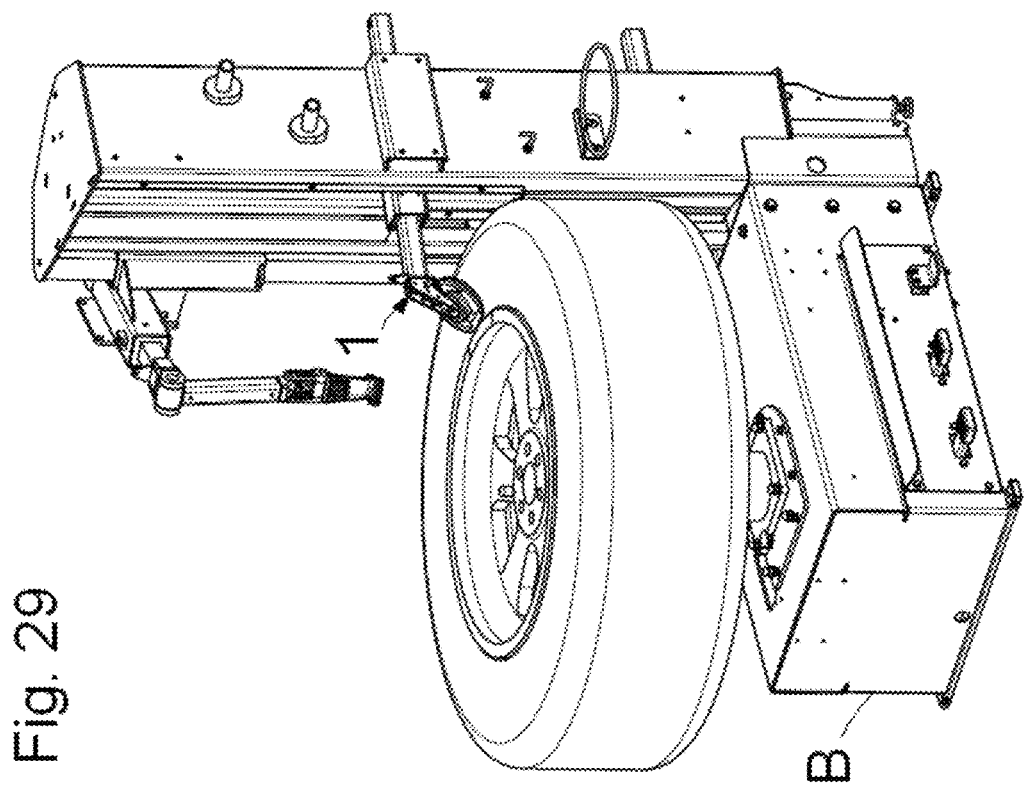

BEAD BREAKER GROUP FOR A TIRE MOUNTING-DEMOUNTING MACHINE

This application claims Paris Convention priority of Italian patent application VR2008A000050, filed Apr. 28, 2008 the complete disclosure of which is hereby incorporated by reference for all purposes.

FIELD OF INVENTION

The present invention regards a bead breaker group, as well as a tire mounting-demounting machine provided with such group, along with a new method of bead breaking a tire mounted on a rim.

BACKGROUND OF INVENTION

As is known, in order demount a tire from a rim, it is first necessary to break the bead of the tire, i.e. separate its beads from the respective edge of the rim and then force, by means of a suitable tire mounting-demounting tool, at least one bead of the tire to go beyond the edge of the rim facing thereto. The bead breaking operation is achieved by means of a so-called bead breaker tool, which can be of fixed type or it can be configured as an idle roller.

The most recently conceived tire mounting-demounting machines comprise a wheel-holder table mounted arranged to rotate on a support base and a column rising from the base, from which one or two telescopic arms extend overhangingly; a bead breaker roller is supported at the free ends of such arms. Each bead breaker roller is normally frustoconical, rather flat, is axially and rotatably supported with tilted rotation axis, e.g. 45°, and contained in a plane passing through the longitudinal axis of the its respective telescopic arm, so that the roller has its distal (end) portion (that which in use is closer to the tire to be bead broken) further away from the column with respect to its own proximal (end) portion (with respect to the column).

In order to carry out a bead breaking operation, after having fixed a tired wheel on the wheel-holder table of the tire mounting-demounting machine, the or each bead breaker roller is brought, typically by means of controlled extension/retraction of the respective telescopic arm which supports it, above the wheel, such that the bead breaker roller is situated at the bead zone of the tire to be bead broken. The approaching of the roller to the side of the tire and to the flange of the wheel rim is then operated, until the distal end of the roller abuts against the flank of the tire and against the flange. At this point, the operator controls (e.g. by means of extension of the telescopic roller-holder arm) a movement of the bead breaker roller in a substantially radial direction (with respect to the rim) and its distal end is then forced to penetrate between the edge of the rim and the bead of the tire. Finally, the wheel-holder table is rotated in order to complete the bead breaking operation over the entire length of the tire bead.

With the bead breaker rollers proposed up to now, a constant intervention of the operator is therefore necessary, as such operator must first drive the advancing of the roller towards the axis of the wheel-holder table and then drive an advancing-lowering of the roller itself between the bead of the tire and the flange of the rim. Following an imprecise driving of the roller by the operator, it can occur that the tire or the rim is ruined, or that the advancing and advancing-lowering operations of the roller must be repeated several times before correctly completing the bead breaking.

In order to remedy this drawback, it was proposed to use so-called feeler pins mounted at each bead breaker roller. Each feeler pin is intended to detect, as the approaching is carried out of the respective bead breaker roller to a tire to be bead broken, the position of the roller with respect to the flange of the rim, and upon reaching correct position, sending a signal to a suitable controller which controls the extension-moving back and lowering-return movements of the respective telescopic arm, so as to obtain the penetration of the bead breaker roller between tire and rim in a nearly automatic manner. Such feeler pins and the controller nevertheless constitute a rather costly system and involve a considerable increase in the production and maintenance costs of the tire mounting-demounting machines on which they are mounted.

SUMMARY OF THE INVENTION

Therefore, the main object of the present invention is that of providing a bead breaker group with very simple structure, suitable for being positioned with precision and being easily and quickly inserted between the bead of the tire and the edge of the rim.

Another object of the present invention is to provide a tire mounting-demounting machine capable of completing the bead breaking operations in a simpler and quicker manner with respect to the conventional tire mounting-demounting.

Another object of the present invention is that of providing a method for bead breaking that can be achieved without particular difficulties, even by non-expert operators.

According to a first aspect of the present invention, a bead breaker group is provided for bead breaking a tire of a tired wheel equipped with rim with bead-engagement flanges, the bead breaker group comprising a support and at least one bead breaker tool mounted rotatably around a pin borne by the support, the bead breaker tool being substantially flat and comprising:

at least one portion configured as an abutment front against a flange of a rim of a tired wheel to be bead broken; and at least one portion having curved peripheral edge substantially coaxial with the pin and intended to act as an engagement-penetration zone between the flange of a rim and the bead of a tire to be bead broken, the distance between the abutment front and the pin being less than the distance between the pin and the at least one engagement-penetration zone.

According to another aspect of the present invention, a bead breaking method is provided for a tire of a tired wheel comprising the following steps:

a) prearranging, on a wheel-holder table, a tired wheel having a rim and a tire;

b) moving a bead breaker group so as to move the at least one portion configured as an abutment front in abutment against a flange of a rim of the tired wheel to be bead broken;

c) rotating the wheel-holder table, in such a manner also causing the rotation via driving of the tool, with consequent engagement-penetration of the engagement-penetration zone between the flange of the rim and the bead of the tire.

BRIEF DESCRIPTION OF THE DRAWINGS

Further aspects of the present invention will be clearer from the following detailed description of several specific embodiments of a bead breaker group, description made with reference to the accompanying drawings, in which:

FIGS. 1 and 2 are perspective, slightly top views of a first bead breaker group embodiment according to the present invention, in two different work positions;

FIG. 3 is a top view of FIG. 1;

FIG. 4 is a section view taken along the line IV-IV of FIG. 3;

FIGS. 5 to 8 are similar views, respectively, of FIGS. 1 to 4, but which illustrate a second bead breaker group embodiment according to the present invention;

FIGS. 9 to 12 are similar views, respectively, of FIGS. 1-4, but which illustrate a third bead breaker group embodiment according to the present invention;

FIGS. 13 to 16 are similar views, respectively, of FIGS. 1-4, but which illustrate a fourth bead breaker group embodiment according to the present invention;

FIGS. 17 to 20 are similar views, respectively, of FIGS. 1-4, but which illustrate a fifth bead breaker group embodiment according to the present invention;

FIGS. 21 and 22 are perspective, slightly top views of a bead breaker group according to FIGS. 17-20, in two different work positions;

FIGS. 23 to 26 are similar views, respectively, of FIGS. 1-4, but which illustrate a sixth bead breaker group embodiment according to the present invention;

FIGS. 27 to 28 are perspective, slightly top views of a bead breaker group according to FIGS. 23-26 in two different work positions; and FIGS. 29 and 30 are perspective, slightly top views of a tire mounting-demounting machine according to the present invention, equipped with a bead breaker group and in two different work positions.

In the drawing set, equivalent or similar parts or components were marked with the same reference numbers.

DETAILED DESCRIPTION OF THE PREFERRED EMBODIMENTS

First, with reference to FIGS. 1-4, a bead breaker group or head 1 is illustrated comprising at least one support component, constituted by, for example, a projecting tool-holder arm 2, and a bead breaker tool 3, formed by a substantially flat element, e.g. like a roller mounted rotatably idle at the head of the tool-holder arm 2. The tool-holder arm 2 extends, in use, with longitudinal axis perpendicular to the main or rotation axis of a tired wheel to be bead broken.

The roller plate element 3 has a wide circumferential edge 3a and is sectioned or cut off, in the sense that it is missing a segment section or segment, where it delimits a nearly rectilinear abutment front 3b. The tool 3 is rotatably mounted (in any suitable manner) around a fixed pin 4 in turn borne by the tool-carrier arm 2. Consequently, the distance of the circumferential edge 3a from the pin 4 is greater than the distance between the pin 4 and the abutment front 3b.

Structurally, the tool-carrier arm 2 can be hollow and bears, preferably at its head, a bracket 5 fixed thereto in any suitable manner, having e.g. an intermediate portion 5a with U-shaped cross section, an attachment shank end 6 (FIG. 4) intended to be inserted in the free end of the tool-carrier arm 2, and the other end 7 bearing the pin 4. The pin 4 is preferably made integral with the bracket 5 (FIG. 4), in a single piece, and is oriented along a tilted axis x-x, e.g. tilted 450 with respect to the longitudinal axis of the tool-holder arm 2 and thus tilted during use, also with respect to the main axis of a tired wheel to be bead broken. In such case, the tool 3 is mounted on the pin 4 with the interposition of antifriction means, typically one or more bearings 8.

The tool-holder arm 2 is installable on a tire mounting-demounting machine equipped with rotatable wheel-holder table and support upright or column, as will be further described below, and can be a telescopic arm or an arm with several articulated sections, in any case with the possibility of being moved in a plane substantially orthogonal to the rotation axis of the wheel-holder table.

If desired, the tool-holder arm 2 has a transversely-jutting ear-shaped element 9, to which a control handle or the like for manually moving or maneuvering the bead breaker group can be fixed.

The operation of one such bead breaker group is quite simple.

The operator, after having locked a tired wheel to be bead broken on the rotatable wheel-holder table of a tire mounting-demounting machine, moves the arm 2 in a manner such that the bead breaker tool 3 is immediately above or in any case close to the flank of the tire of the wheel and close to the respective flange of the rim. At this point, the bead breaker tool 3 with its own abutment front 3b is brought against the flange of the rim and is maintained in such abutted or slightly forced position against the adjacent flank of the tire.

The operator then controls the rotation of the wheel-holder table and due to the friction between tire and bead breaker tool 3, the latter will be rotated together with the tire, so that its circumferential portion 3a will be forced to be engaged and to penetrate between the flange of the rim and the bead of the tire, i.e. it will carry out an angular penetration travel, thus initiating the bead breaking of the wheel. Upon completed bead breaking, it will be sufficient to make the wheel-carrier table briefly rotate in the direction opposite its previous rotation direction, in order to force the tool to disengage by means of an angular backward travel.

With reference to FIGS. 5-8, a bead breaker group 1a is illustrated that is entirely similar to that described with reference to FIGS. 1-4, but is provided with an actuator means, for example a double-effect pneumatic jack 10, whose cylinder 10a is articulated to the tool-holder arm 2, preferably by means of a fork bracket 11, while its stem 10b is articulated to the bead breaker tool 3 in a predetermined position at the zone subtended by the edge 3a.

For the functioning of one such bead breaker group, one proceeds as in the previously described example, except that after having brought the tool 3 (initially with stem 10b of the jack 10 retracted) with its own abutment front 3b in abutment against the flange of the rim, the extension of the stem 10b is operated, followed by the forced rotation of the tool 2, which will be obliged to penetrate between the tire and the rim, initiating the bead breaking. The tired wheel is then rotated, and upon completion of the bead breaking operation, the stem 10b is operated to move back, so that the tool 3 is disengaged both from the rim and from the bead of the tire, after which the bead breaker group can be moved away from the bead broken wheel.

In FIGS. 9 to 12, a bead breaker group 1b is instead illustrated equipped with an elastic return means, for example a helical spring 12, for the tool 3, which on one side is fixed to a pin 13, in turn fixed to the bracket 5, and on the other side (for example by means of a pin 14) is fixed to the bead breaker tool 3, such that the rotation of the tool 3 with respect to the support component is opposed by the action of the spring 12.

After having brought, as described above, the tool 3 with its own engagement front 3b in abutment against the flange of the rim and against the flank of the tire, the wheel-holder table is rotated in clockwise direction, thus causing the rotation and penetration of the tool, opposing the action of the spring 12. Upon completed bead breaking, by operating the stopping of the wheel-holder table, the spring 12 will bring the tool 3 into rest position, i.e. in a position of disengagement both from the bead of the tire and from the rim. It will then be possible to move the bead breaker group away from the now-bead broken tired wheel.

With reference to FIGS. 13 to 16, a bead breaker group 1c is instead illustrated, which is similar to that illustrated in FIGS. 5 to 8, but has an antifriction element, such as a counter-roller element 15 mounted idle and coaxial with the tool 3 at the face of the latter that in use is turned against the flank of the tire to be bead broken.

Moreover, the tool 3 has a slightly different configuration from that of the tools according to the above-described embodiments, and in particular is configured as an oscillating arm and has an engagement-penetration zone, shaped as a tip 3c, and two lateral abutment fronts, configured as a rectilinear segment 3d, arranged with one on one side of the engagement zone 3c and the other on the other side of such zone 3c.

Also for such group, the distance between engagement front 3d and pin 4 is less than the distance between pin 4 and engagement-penetration zone 3c.

Such tool functions substantially in the same manner described with reference in FIGS. 5 to 8, nevertheless, during the bead breaking operations, the counter-roller element 15 is driven in rotation by the tire and reduces the friction between tire and tool.

In the absence of such counter-roller element 15, the operator before demounting a tired wheel would be obliged to spread grease over part of the tire, in order to facilitate the sliding of the tools (mounting or bead breaking) on the tire during the various work operations.

In FIGS. 17 to 22, a bead breaker group 1d is illustrated very similar to that described above, except that the tool has an engagement-penetration zone 3e of greater extension than the zone 3c, and two substantially parallel abutment fronts 3f. Also for such group, the distance between abutment front 3f and pin 4 is less than the distance between pin 4 and engagement-penetration zone 3d.

FIGS. 23 to 28, on the other hand, illustrate a bead breaker group 1e like that illustrated in FIGS. 17-22, but a helical spring 12 is provided in place of the actuator 10.

Finally, with reference to FIGS. 29 and 30, a tire mounting-demounting machine is illustrated having a support base B for a wheel-holder table, from which a column C upwardly extends. Such machine also provides for additional (two in the illustrated example) tool-holder arms, at least one of which supports a bead breaker group like that which is the subject of the present invention.

It will be understood that with a bead breaker group according to the present invention it is possible to carry out bead breaking operations in a much simpler and quicker manner with respect to the groups proposed up to now. Indeed, the operator, after having mounted a tired wheel on the table, brings the group just above the tire (for the machines with vertical column and wheel-holder with vertical rotation axis), then brings the group close to the tire until the tool, at its abutment front zone, is abutting against the flank of the tire, the engagement-penetration zone(s) being instead raised with respect to the flank itself. By rotating the table or by driving the actuator, rotation is caused (see in particular FIGS. 22 and 28) of the tool which is inserted below the edge of the rim, and thus penetrates between the tire and the rim.

Therefore, unlike the bead breaker groups proposed up to now, one will appreciate the fact that the operator does not have to control the tool to be moved in a combined manner in the direction of the table axis and towards the axis itself, but he must only control the tool to be moved parallel to the axis of the table, and the configuration of the tool will allow the penetration (automatic if the actuator is not provided) of the tool itself between the tire and rim.

A man skilled in the art will understand that a tire mounting-demounting machine can also be equipped with additional bead breaking groups according to the present invention, e.g. a pair intended for simultaneously bead breaking a respective flank (in use, an upper and a lower) of a tire.

A bead breaker group was described for machines with wheel-holder table with vertical rotation axis, but the same considerations can be made for machines with wheel-holder table with rotation axis that is horizontal or tilted with respect to the vertical.

The bead breaker group described above is susceptible to numerous modifications and variations within the protection scope defined by the following claims.

The invention claimed is:

1. A bead breaker group for bead breaking a tire of a tired wheel equipped with rim with bead-engagement flanges, said bead breaker group comprising a support and at least one bead breaker tool mounted for rotation around a pin borne by said support, and wherein said bead breaker tool is substantially flat and comprises:
   at least one peripheral portion configured as an abutment front against a flange of a rim of a tired wheel to be bead broken; and
   at least one portion having curved peripheral edge substantially coaxial with the pin and intended to act as an engagement-penetration zone between the flange of a rim and the bead of a tire to be bead broken,
   the distance between said abutment front and said pin being less than the distance between said pin and said at least one engagement-penetration zone
   wherein said bead breaker tool is configured as a sectioned roller lacking a segment thereof, thereby having a rectilinear front.

2. A group according to claim 1, comprising at least one actuator means intended to control angular movements of said tool around said pin and secured on one side to said support and on the other side to said bead breaker tool.

3. A group according to claim 2, wherein said actuator means is secured to said bead breaker tool at said engagement-penetration zone.

4. A group according to claim 1, wherein said bead breaker tool comprises at least one return means which opposes angular engagement-penetration movements of said tool around said pin.

5. A group according to claim 1, wherein said bead breaker tool comprises at least one antifriction element intended to dampen, in use, friction between the tool and the tire.

6. A group according to claim 5, wherein said at least one antifriction element comprises a counter-roller mounted idle on said pin at the face of said bead breaker tool directed, in use, against a tire.

7. A group according to claim 1, wherein said bead breaker tool is configured as an oscillating arm, and has an engagement-penetration edge and two lateral abutment fronts.

8. A group according to claim 7, wherein said two lateral abutment fronts are substantially parallel to each other.

9. A group according to claim 1, wherein said support comprises a projecting tool-holder arm terminating with a bracket element set for supporting said pin with longitudinal axis tilted with respect to said tool-holder arm.

10. A tire mounting-demounting machine comprising a base, a wheel-holder table rotatably supported by said base and a column extending upward starting from said base, comprising at least one bead breaker group according to claim 1 supported by said column.

11. A method for bead breaking a tire of a tired wheel, comprising the following steps:
   a) prearranging a tire mounting-demounting machine comprising a base, a wheel-holder table rotatably supported by said base and a column extending upward starting from said base, comprising at least one bead breaker group supported by said column, said bead breaker group comprising:
- a support and at least one bead breaker tool mounted for rotation around a pin borne by said support, and wherein said bead breaker tool is substantially flat and comprises:
  - at least one peripheral portion configured as an abutment front against a flange of a rim of a tired wheel to be bead broken; and
  - at least one portion having curved peripheral edge substantially coaxial with the pin and intended to act as an engagement-penetration zone between the flange of a rim and the bead of a tire to be bead broken,
  - the distance between said abutment front and said pin being less than the distance between said pin and said at least one engagement-penetration zone, said bead breaker tool being configured as a sectioned roller lacking a segment thereof, thereby having a rectilinear front, and
- b) prearranging, on said wheel-holder table, a tired wheel having a rim and a tire;
- c) moving a bead breaker group so as to move said at least one portion configured as an abutment front in abutment against a flange of a rim of the tired wheel to be bead broken;
- d) rotating said wheel-holder table, thus also causing the rotation via driving of said tool with consequent engagement-penetration of said engagement-penetration zone between the flange of the rim and the bead of the tire.

12. A method according to claim 11, comprising the stopping and reversing of the rotation direction of said wheel-holder table upon completed bead breaking, in order to disengage said tool from the rim and from the tire by forcing it to carry out, due to friction, an angular travel in the direction opposite that carried out during said step c).

13. A method for bead breaking a tire, comprising the following steps:
- a) prearranging a tire mounting-demounting machine comprising a base, a wheel-holder table rotatably supported by said base and a column extended upward starting from said base, comprising at least one bead breaker group supported by said column, said bead breaker group including:
  - a support and at least one bead breaker tool mounted for rotation around a pin borne by said support, and wherein said bead breaker tool is substantially flat and comprises:
    - at least one peripheral portion configured as an abutment front against a flange of a rim of a tired wheel to be bead broken; and
    - at least one portion having curved peripheral edge substantially coaxial with the pin and intended to act as an engagement-penetration zone between the flange of a rim and the bead of a tire to be bead broken,
    - the distance between said abutment front and said pin being less than the distance between said pin and said at least one engagement-penetration zone, said bead breaker tool being configured as a sectioned roller lacking a segment thereof, thereby having a rectilinear front,
  - said bead breaker group further comprising at least one actuator means intended to control angular movements of said tool around said pin and secured on one side to said support and on the other side to said bead breaker tool,
- b) prearranging a tired wheel including a tire and a rim on said wheel-holder table;
- c) moving a bead breaker group so as to move said at least one portion configured as an abutment front in abutment against a flange of a rim of the tired wheel to be bead broken;
- d) driving said at least one actuator means for operating an angular engagement-insertion movement of said tool between said flange of the rim and the bead of the tire; and
- e) rotating said wheel-holder table.

14. A method according to claim 13, comprising stopping said wheel-holder table and backward-driving said actuator means in order to disengage said tool from the rim and from the tire.

* * * * *